United States Patent [19]

Underwood

[11] 4,080,843
[45] Mar. 28, 1978

[54] VEHICLE ACCESSORY DRIVE

[75] Inventor: Herbert N. Underwood, Chicago, Ill.

[73] Assignee: Borg-Warner Corporation, Chicago, Ill.

[21] Appl. No.: 750,083

[22] Filed: Dec. 13, 1976

[51] Int. Cl.² ............................................. F16H 5/42
[52] U.S. Cl. .................................. 74/336 R; 74/664; 123/41.11; 192/104 R
[58] Field of Search .................. 123/41.11; 74/15.84, 74/336 R, 664, 665 P, 722; 192/103 R, 104 R; 60/608

[56] References Cited

U.S. PATENT DOCUMENTS

| | | | |
|---|---|---|---|
| 1,030,934 | 7/1912 | Smith | 192/104 R |
| 1,887,355 | 11/1932 | Kranick | 74/15.84 |
| 2,162,873 | 6/1939 | Wolfraid | 192/103 R |
| 2,195,354 | 3/1940 | Bateman | 192/105 |
| 2,494,960 | 1/1950 | Pepper | 74/810 |
| 2,618,979 | 11/1952 | Benning | 74/15.4 |
| 2,769,303 | 11/1956 | Lucia et al. | 60/608 |
| 2,869,698 | 1/1959 | Conlee | 192/103 R X |
| 2,917,937 | 12/1959 | Dodge | 74/336 |
| 2,957,372 | 10/1960 | Gibson | 74/722 |
| 2,962,910 | 12/1960 | Wolfram | 74/230.17 |
| 2,967,597 | 1/1961 | Binder | 192/105 |
| 2,974,544 | 3/1961 | Miner | 74/689 |
| 3,048,056 | 8/1962 | Wolfram | 74/665 |
| 3,157,066 | 11/1964 | Donley et al. | 74/665 |
| 3,290,963 | 12/1966 | Oldfield et al. | 74/810 |
| 3,581,853 | 6/1971 | Hoff | 192/4 |
| 3,643,642 | 2/1972 | Junes | 123/198 C |
| 3,747,731 | 7/1973 | Smirl | 192/104 R |

Primary Examiner—Edgar W. Geoghegan
Attorney, Agent, or Firm—James A. Geppert

[57] ABSTRACT

An improved accessory drive which employs the crankshaft and camshaft of an internal combustion engine to operate, at different times, the accessory drive system for the engine; the camshaft rotating at exactly 50% of the speed of the crankshaft. A clutching system disconnects the crankshaft from the accessory drive system at a predetermined speed of rotation to allow the slower camshaft to assume activation of the accessory drive system.

13 Claims, 6 Drawing Figures

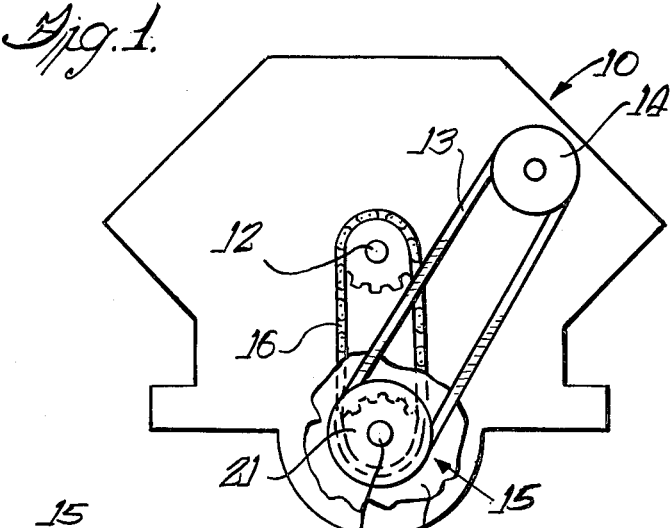
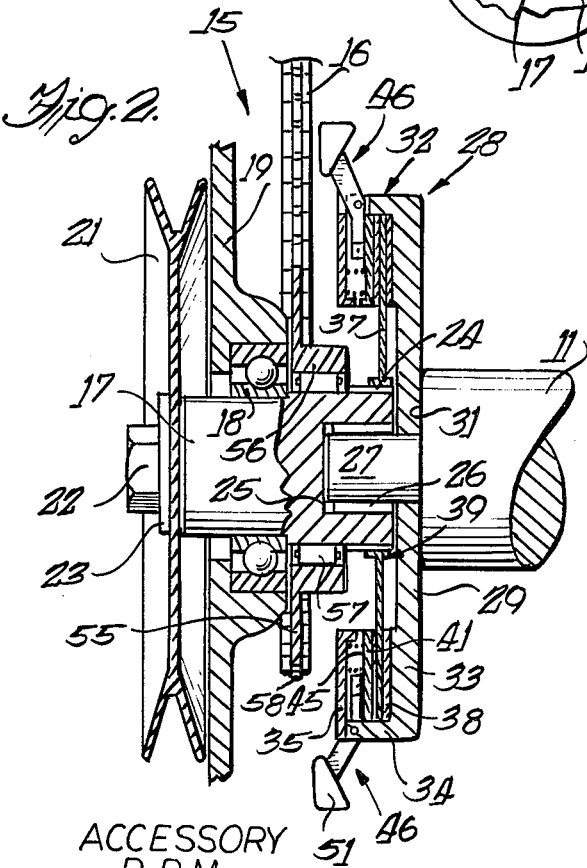
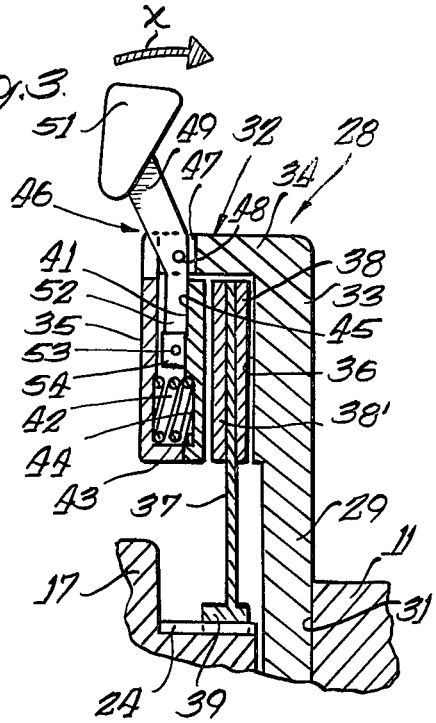
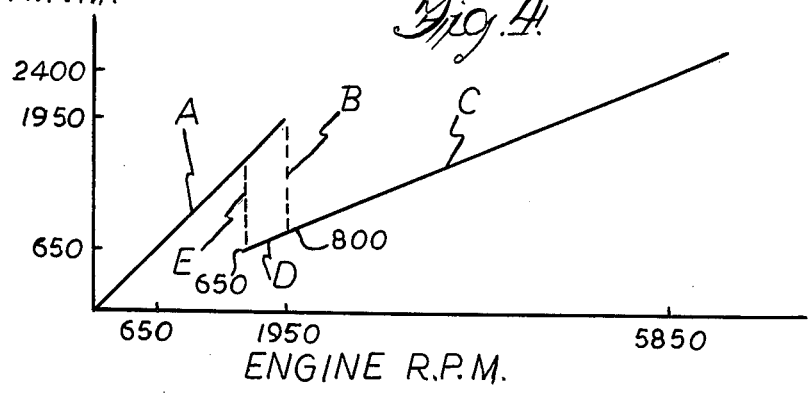

VEHICLE ACCESSORY DRIVE

BACKGROUND OF THE INVENTION

Present day automobiles are being increasingly loaded with accessories including the engine fan; alternator for the battery; air conditioning; and pumps for servo-operations such as automatic shifts, power windows, power steering, power brakes, and the like. Such accessories have been designed to operate satisfactorily at engine idling speeds and continue satisfactory operation at top engine speeds, but the result of such an arrangement is to severely limit the performance of the engine. This is true because even though at their optimum speeds, the total power consumption of the accessories is only a few horsepower; at high speeds the accessories are less efficient and power consumption may be ten to twenty percent of the engine output. One way of handling this problem is to provide a variable speed drive arrangement to provide a fairly constant accessory speed as the engine reaches the necessary speed for operation of the vehicle. However, such a variable speed drive system is relatively complicated in construction and operation. The present invention obviates the above problem in providing a simplified and efficient accessory drive system.

Present U.S. automobile manufacturers are in general using such low numerical rear axle ratios that an accessory drive has limited value. With the advent of lighter, smaller cars, the car manufacturers will change to smaller and lighter engines and will run them at higher rpm levels; resulting in the use of high numerical rear axle ratios. For example, a first small car presently manufactured will use an 85 or 97 C.I.D. engine with a 4.11 to 1 rear axle ratio and weigh aproximately 2000 pounds. This compares to a second small car in production having an 140 C.I.D. engine with a 2.92 to 1 rear axle ratio (using a four speed transmission) and a weight of approximately 2600 pounds. The first car requires the 4.11 to 1 rear axle ratio to obtain reasonable performance. The second car's engine will turn 2366 rpm at 55 mph while the first car's engine will turn at 3330 rpm. Thus, higher rpms will be a trend in future smaller cars.

The present invention relates to a simple two-speed accessory drive which employs the two rotating shafts on an internal combustion engine; namely, the crankshaft and the camshaft. The camshaft runs at 50% of crankshaft speed, and through design of the drive system, this ratio of camshaft to crankshaft rpm can be utilized to arrive at a better choice of accessory rpm ranges. The accessory is driven directly by the crankshaft from idle to a predetermined speed level of the crankshaft where the efficiency of the accessory drive will tend to decrease at increasingly higher rpms. Then a suitable clutching arrangement allows the camshaft, operating at 50% of crankshaft speed, to take over the drive of the accessories and the rpm of the accessory drive will again increase but at a lower speed than that of the crankshaft.

Another object of the present invention is the provision of a two-speed accessory drive for an internal combustion engine wherein a centrifugal clutch arrangement is utilized to provide for release of the crankshaft drive and a one-way clutch provides for engagement of the camshaft drive. The accessory drive pulley is mounted on a stub shaft in alignment with and connected to the crankshaft through the centrifugal clutch mechanism; the stub shaft being suitably mounted in a bearing on the engine. A drive sprocket connected to the camshaft through a drive chain is mounted on and operatively connected to the stub shaft through a suitable one-way clutch, such as a sprag clutch.

The present invention also provides an accessory drive for an internal combustion engine wherein a slipping clutch is utilized between the crankshaft and the stub shaft carrying the pulley for the accessory drive. The use of the slipping clutch will provide a time interval of substantially constant rpm during which the crankshaft is released from the stub shaft and before the camshaft takes over the accessory drive through a one-way clutch. This arrangement will omit a sharp drop in the speed of the accessory drive and provide a smooth transition.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a schematic front elevational view of an internal combustion engine with the accessory drive thereon.

FIG. 2 is a vertical cross sectional view of one embodiment of accessory drive using a centrifugal clutch.

FIG. 3 is an enlarged partial cross sectional view of the centrifugal clutch for the accessory drive shown in released condition.

FIG. 4 is a graph representation showing the relationship of accessory speed to engine speed for the accessory drive of FIG. 2.

DESCRIPTION OF THE PREFERRED EMBODIMENTS

Figure 5:
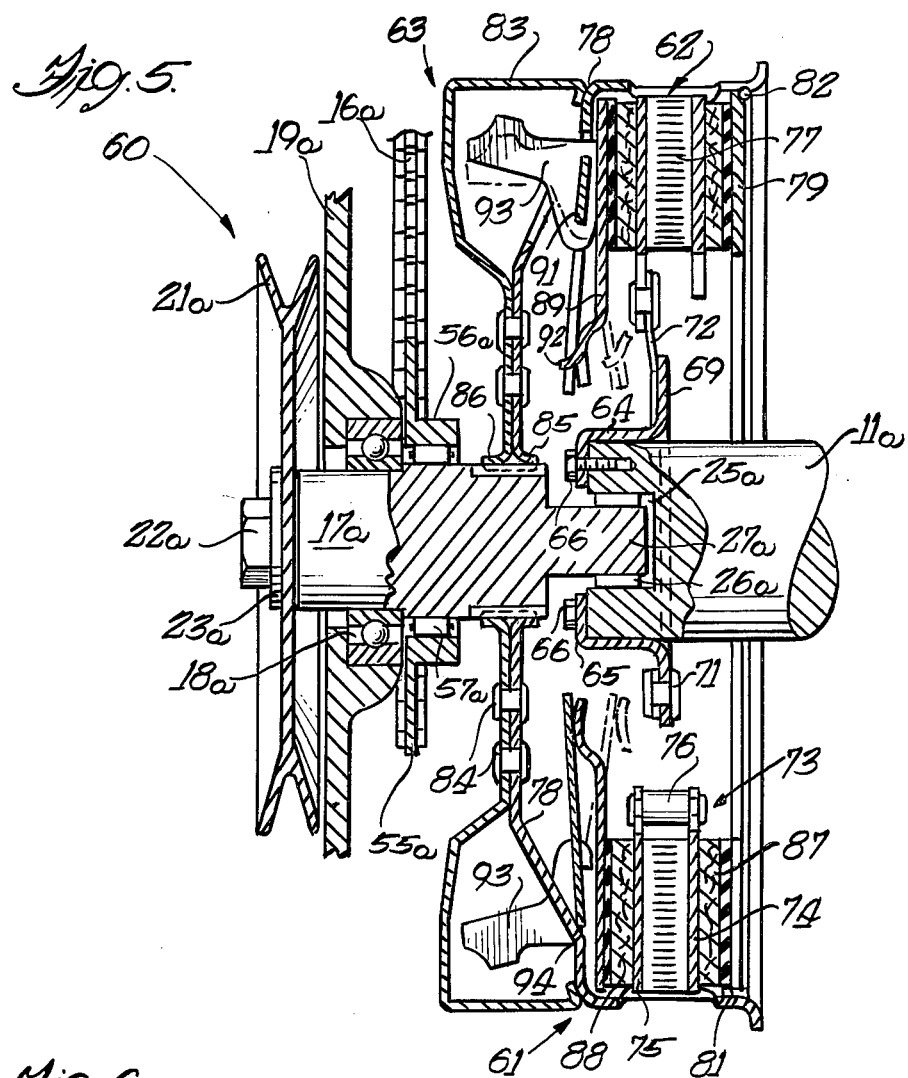
FIG. 5 is a vertical cross sectional view of an alternate embodiment of accessory drive utilizing a slipping clutch.

Referring more particularly to the disclosure in the drawings wherein are shown illustrative embodiments of the present invention, FIG. 1 discloses an internal combustion engine 10 having a crankshaft 11 (FIG. 2) and one or more camshafts 12. The engine 10 is provided with one or more accessories, such as an alternator, power steering, air conditioning, etc., which are driven through suitable belts 13 and a pulley 14 for each said accessory. An accessory drive 15 for the belt or belts 13 is mounted at the forward end of the crankshaft 11, and a drive chain 16 is driven by the camshaft 12 and operatively connected to the accessory drive 15.

As more clearly shown in FIG. 2, the accessory drive 15 comprises a stub shaft 17 rotatably mounted in a bearing 18 located in a support wall 19 of the engine. A drive pulley 21 is suitably mounted on the free end of the shaft 17, such as by a bolt 22 threadingly engaging a threaded opening in the end of the shaft and washer 23. The opposite end of the stub shaft 17 is provided with an exterior splining 24 and a central opening 25 receiving roller bearings 26 between the wall of the opening and a reduced end 27 of the crankshaft. Also mounted on the reduced end 27 for rotation with the crankshaft 11 is a housing plate 29 for a centrifugal clutch 28, with the plate abutting the shoulder 31 defining the reduced end 27.

The centrifugal clutch 28 includes a generally annular housing 32 located at the outer periphery of the plate 29; the housing being U-shaped in cross section and opening radially inwardly. The housing is formed by a wall 33 as an extension of but thicker than the plate 29 and terminating in an annular rim 34, and an annular plate 35 secured thereto. Although shown as an annular plate, the member 35 could also be formed of a plurality of segments attached to the rim 34 for ease of disassembly and repair. The wall 33 provides a friction surface 36 to be engaged by an annular friction facing 38 secured to one side of an axially reciprocable clutch plate 37 mounted for rotation with an axial movement on the stub shaft 17 by the spline connection 24. An annular hub 39 is formed on the inner periphery of the clutch plate 37 with internal splining to engage the splining 24.

The opposite side of the clutch plate 37 also has an annular friction member 38' facing the wall 35 to be engaged by an annular driving plate 41 in the housing and yieldably biased toward the clutch plate 37 by a plurality of circumferentially spaced compression springs 42 positioned behind an annular flange 43 on the wall 35 and received in recesses 44 in the back surface 45 of the driving plate. A plurality of bell crank levers 46 are pivotally mounted in circumferentially spaced slots 47 in the rim 34 on pivot pins 48 with one arm 49 of each lever extending outwardly and rearwardly at an angle to the housing and terminating in a bob-weight 51. The oppositely extending arm 52 of each lever extends radially inwardly into the housing behind the driving plate 41 to be pivotally secured to the plate by a pin 53 extending through a pair of mounting tabs 54 integral with the plate 41 and the end of the arm 52 positioned therebetween.

A sprocket 55 is positioned adjacent the bearing 18 and has a hub 56 with an internal diameter greater than the external diameter of the stub shaft 17 to provide an annular spacing for a suitable one-way clutch 57 such as a sprag-type clutch, for a purpose to be later described. The sprocket has peripheral teeth 58 for engagement with the drive chain 16.

As an illustration of the operation of this accessory drive 15, a chain 16 is used for the chain drive with a 1:0.82 ratio and the ratio of 1:0.50 is provided between the crankshaft and the camshaft. Thus, with the crankshaft turning at 1950 rpm, the camshaft is turning at 975 rpm and the accessory drive under the impetus of the drive chain is turning at 800 rpm; a ratio of 1:0.41 between the crankshaft and the accessory drive. As the crankshaft to camshaft ratio is constant, the choice of rpm for the accessory drive depends on the camshaft to stub shaft ratio.

The accessory drive at idle and up to 1950 rpm is running at crankshaft speed. Thus, accessory rpm is equal to engine rpm as shown by line A on the graph of FIG. 4. At 1950 rpm, the centrifugal clutch 28 releases due to the centrifugal force acting on the bob-weights 51 and the camshaft drive (with its 1:0.82 ratio) takes over by way of the one-way clutch 57. More specifically, as the camshaft speed is lower than that of the crankshaft, the one-way clutch 57 will overrun due to the higher speed of the stub shaft 17 through the centrifugal clutch 28 at low speeds. As the clutch 28 increases in speed, the centrifugal force acts on the bob-weights 51 tending to urge them outward in the direction of the arrow X (see FIG. 3). Movement of the bob-weights 51 will cause rotation of the bell crank levers 46 about the pivot pins 48 to retract the driving plate 41 against the force of the springs 42.

In the present structure the clutch 28 releases at a predetermined speed as shown at 1950 rpm at the upper end of line A. Upon release, the stub shaft speed will drop as shown by dotted line B until it reaches 800 rpm where the one-way clutch 57 engages and the camshaft drives the sprocket 55 through the drive chain 16 (0.82×0.50×1950=800 rpm). Then, the accessory drive speed will increase at a lower rate as shown by the line C. At a maximum engine speed of 5850 rmp, the accessory drive speed is 2400 rpm (082×0.50×5850=2400 rpm). Thus, the engine operates between 650 rpm (idle) and 5850 rpm for a 1:9 rpm range, while the accessory drive operates between 650 rpm and 2400 rpm for a 1:3.7 rpm range.

The operating range of an engine projected to be run in a 1985 car with a high numerical final drive will be 650 to 3000 rpm at 55 L mph cruising speed for a 1:4.62 rpm range. The accessory drive will then be running at 1230 rpm at cruising speed (3000 engine rpm), but the accessory rpm will pass through 1950 rpm (line A of graph) to reach cruising speed, thus the rpm range will be 1:3 for the accessory drive. Also, the accessory drive has a hysteresis loop built into it to prevent hunting. With the car in high gear, the accessory drive will be direct until 36 mph and then will shift to the lower rpm range (lines B and C). If the car is slowed after passing into the "accessory shift into low" (line C), the shift back into direct drive will not occur until the car slows to 29 mph. This is shown in the graph by line D with the car slowing until the accessory drive reaches 650 rpm and then shifts to direct drive on line E. The actual accessories can rotate at a higher rpm than the 650 to 2400 rpm range (such as 1000 to 3700 rpm) by appropriate pulley arrangements.

FIG. 5 discloses an alternate accessory drive arrangement employing a slipping clutch to eliminate the sharp drop in accessory drive speed at 1950 rpm (line B on FIG. 4). Instead, a curved or generally horizontal line will connect the direct drive and low-speed portions of the accessory drive. With reference to FIG. 5, like parts will be denoted with the same reference numerals with the addition of a script a. An accessory drive 60 is operatively connected to the crankshaft 11a of an automobile engine, such as shown in FIG. 1, and has a stub shaft 17a rotatably mounted in a bearing 18a in support wall 19a adjacent a slipping clutch assembly 61. A drive pulley 21a is secured on the outer end of the stub shaft 17a by a bolt 22a and washer 23a, and the opposite end of the stub shaft 17a has a reduced end 27a to be received in a recess 25a in the crankshaft 11a provided with roller bearings 26a. A sprocket 55a is driven by the drive chain 16a from the chain driven camshaft (not shown) and has a hub 56a spaced from the stub shaft 17a to accommodate a suitable one-way clutch 57a, such as a sprag clutch.

The slipping clutch assembly 61 is substantially the same as shown in the Richard L. Smirl U.S. Pat. No. 3,747,731 and includes a driving member 62 operatively connected to the crankshaft 11a and a driven member 63 operatively connected to the stub shaft 17a. The driving member 62 comprises a hub 64 mounted on the end of the crankshaft 11a by a radially inner flange portion 65 secured onto the end of the crankshaft 11a by bolts 66. The hub has a radial flange 69 provided with apertures for rivets 71 to secure a plurality of drive straps 72 to the hub. A rotor 73 includes a pair of spaced apart plates 74, 75 separated by a plurality of spacers 76 and joined by a convoluted fin member 77 acting to promote air flow through the rotor. The straps 72 are formed of relatively thin metal permitting axial deflection and are connected between the flange 69 and the plate 75. The rotor 73 is thus connected for rotation with the hub 64 and the crankshaft 11a.

The driven member 63 consists of a housing 78 to which a reaction member 79 is affixed by means of a drive pin 81 and an annular wire retaining ring 82. A cover 83 formed out of sheet metal is secured to the housing 78 by rivets 84 with the radially inner flanges 85, 86 of the housing 78 and cover 83, respectively, being suitably connected to the stub shaft 17a, as by a splined connection.

An annular friction member 87 is carried by the reaction member 79 and engages one plate 74, while a second friction member 88 engaging the opposite plate 75 is carried by a generally plate-like pressure applying member 89. Biasing means for the pressure applying member 89 is illustrated in the form of a Belleville spring 91 carried by the housing 78 and positioned between the housing and the pressure plate 89. Upon assembly of the drive system, the spring 91 is placed in a compressed state to exert a force against the pressure plate 89 and urge the friction member 88 into frictional engagement with the plate 75; the friction element 87 frictionally engaging the plate 74. Tabs 92 are formed on the pressure plate 89 to engage radial slots in the spring 91 so that the members rotate together.

Centrifugal weights 93 are attached to the spring 91 and extend laterally therefrom into the cover 83 to be acted upon by centrifugal force upon rotation of the housing 78, cover 83 and the spring 91. The weights will tend to pivot outwardly as shown in full lines in FIG. 5 about a point 94, however, no substantial movement occurs. Instead, the centrifugal force acting on the weights produces a moment having a force component which acts to oppose and thereby decrease the engaging force of the spring as the speed of the driven member increases.

Figure 6:
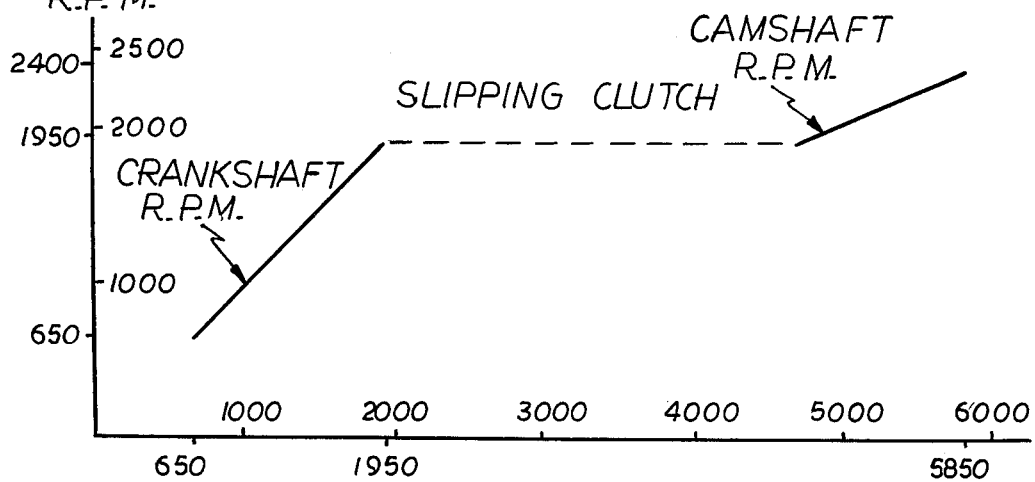
FIG. 6 is a graph representation of the relationship of accessory speed to the engine speed for the accessory drive of FIG. 5.

In operation, the engine idles at a speed of 650 rpm, while the camshaft speed is 50% thereof, and the accessory drive is in direct engagement with the crankshaft through the clutch assembly 61. As seen on the graph of FIG. 6, the accessory drive speed through the drive pulley 21a has the same revolutions per minute as the engine crankshaft 11a until crankshaft speed reaches 1950 rpm. The camshaft speed is exactly one-half of the crankshaft speed, and the sprocket speed may have a 0.82:1 ratio due to the chain drive 16a so that the one-way clutch 57a is disengaged from the stub shaft 17a. As the crankshaft speed approaches 1950 rpm, the centrifugal force increases causing the weights to produce a moment having a force component acting to oppose the engaging force of the spring 91. At 1950 rpm, the force component opposing the spring force reaches a level where the spring force is overcome sufficiently to allow for slippage between the plates 74, 75 and the friction members 87, 88. With an increase in crankshaft speed, the amount of slippage increases to provide a substantially constant rpm for the driven member 63 and the stub shaft 17a; this result being shown as the horizontal dotted line on the graph.

Thus, while the crankshaft speed increases, the pulley speed remains substantially constant at 1950 rpm. However, the camshaft speed will increase, but at one-half the rate of crankshaft speed. When the camshaft rotation reaches and then slightly exceeds 1950 rpm, the sprocket will be rotating at a faster speed than the stub shaft 17a causing the one-way clutch 57a to engage and the camshaft will then drive the pulley 21a. The accessory drive speed will then increase as shown by the slanted line on the right-hand side of the graph of FIG. 6. In decelerating the engine, the accessory drive speed will follow the lines on the graph in a reverse direction.

Where the driving means between the camshaft and the crankshaft is a chain drive, the drive from the camshaft to the stub shaft will be a chain drive as shown in the described embodiments. Likewise, if the driving means from the crankshaft to the camshaft is a gear drive, the driving means from the camshaft to the overrunning clutch on the stub shaft must be a gear drive, and both types of driving means are contemplated by the present invention.

I claim:

1. An accessory drive for an internal combustion engine of an automotive vehicle having a crankshaft and a camshaft rotating at a speed of one-half the crankshaft speed, comprising a stub shaft carrying an accessory drive pulley, first clutch means operatively connecting the stub shaft to the crankshaft, and second clutch means operatively connecting the stub shaft with the cam shaft only when the crankshaft speed exceeds a predetermined value.

2. An accessory drive as set forth in claim 1, in which said second clutch means is a one-way overrunning clutch that is driven by said camshaft through suitable drive means.

3. An accessory drive as set forth in claim 2, in which said first clutch means comprises a centrifugal clutch that will release said stub shaft upon the crankshaft reaching a predetermined speed level.

4. An accessory drive as set forth in claim 3, in which said centrifugal clutch includes a clutch housing affixed to rotate with said crankshaft, a clutch plate rotatable with said stub shaft, and a yieldably biased pressure plate normally engaging said clutch plate.

5. An accessory drive as set forth in claim 4, in which said centrifugal clutch includes a plurality of bob-weights pivotally mounted in said clutch housing and operatively connected to said pressure plate.

6. An accessory drive as set forth in claim 5, in which said bob-weights are mounted on the outer ends of bell crank levers, said levers being pivoted intermediate their ends in the clutch housing and pivotally mounted at their inner ends onto the pressure plate.

7. An accessory drive as set forth in claim 4, including a plurality of compression springs in said clutch housing engaging and urging said pressure plate towards said clutch plate.

8. An accessory drive as set forth in claim 3, wherein said clutch provides a two-speed drive for the accessory drive pulley, said centrifugal clutch providing a direct drive from the crankshaft to said pulley at idle and during acceleration to a predetermined crankshaft speed wherein said centrifugal clutch releases said stub shaft, said stub shaft normally overrunning said one-way clutch during the above speed range until the centrifugal clutch releases to provide a sudden drop in the stub shaft speed wherein said one-way clutch engages to drive the accessory pulley at a slower speed for the remainder of the speed increase of said crankshaft.

9. An accessory drive as set forth in claim 8, in which during deceleration of said crankshaft from a speed above said predetermined speed value, said stub shaft will be driven by said camshaft through the one-way clutch until said crankshaft reaches a speed value lower than said abovementioned predetermined speed values, at which lower speed the centrifugal clutch reengages to provide direct drive from said crankshaft.

10. An accessory drive as set forth in claim 1, in which said first clutch means comprises a centrifugal clutch having a clutch housing non-rotatably mounted on said crankshaft, a flexible clutch plate non-rotatably mounted on said stub shaft, a pressure plate in said housing, a plurality of compression springs in said housing yieldably biasing said pressure plate against said clutch plate, a plurality of bell crank levers pivotally mounted and circumferentially spaced about the periphery of the clutch housing and a bob-weight on the outer end of each lever, the inner end of each lever being operatively connected to said pressure plate, and said second clutch means comprises an overrunning one-way clutch between a sprocket and the stub shaft, and a drive chain from said camshaft engaging and driving said sprocket, said centrifugal clutch providing a direct drive between the crankshaft and the stub shaft at the idle speed for the engine and during acceleration to a predetermined crankshaft speed, at which point, said centrifugal clutch releases the stub shaft, and said one-way clutch engages to drive the stub shaft as the stub shaft speed drops to below the speed of said camshaft.

11. An accessory drive as set forth in claim 2, in which said first clutch means is a slipping clutch that will begin to slip at a predetermined crankshaft speed and provides a constant drive speed during any further acceleration of the crankshaft.

12. An accessory drive as set forth in claim 11, wherein said stub shaft will be directly driven by said crankshaft at idle and during acceleration to the predetermined constant speed level, and said stub shaft will continue to be driven by said crankshaft at constant speed until the speed of the camshaft acting on said one-way clutch approaches and overcomes the speed of said stub shaft to cause engagement of the one-way clutch to increase the stub shaft speed as the camshaft speed further increases.

13. An accesssory drive as set forth in claim 11, in which said slipping clutch includes a driving member in direct engagement with said crankshaft, a driven member operatively connected to said stub shaft, friction means between said driving and driven members, and centrifugally actuated means to lessen frictional engagement as crankshaft speed increases above a predetermined level.

* * * * *